United States Patent
Manuszak et al.

[11] Patent Number: 6,106,221
[45] Date of Patent: Aug. 22, 2000

[54] ROBOT-BASED DISPENSING STATION

[75] Inventors: Michael M. Manuszak, St. Clair; Peter J. Deir, Fraser; James B. Springborn, deceased, late of Lapeer; by Angela D. Burgess, heiress, Clinton Township; by Cris C. Potts, legal representative, Marine City, all of Mich.

[73] Assignee: ABB Flexible Automation Inc., New Berlin, Wis.

[21] Appl. No.: 08/961,591

[22] Filed: Oct. 31, 1997

(Under 37 CFR 1.47)

[51] Int. Cl.⁷ ..................................................... B65G 59/06
[52] U.S. Cl. .................................... 414/797.9; 414/798.1; 221/266; 221/263; 221/270; 221/124
[58] Field of Search ................................ 414/797.9, 798, 414/798.1, 795.7, 797.4; 221/266, 263, 270, 224, 234, 124

[56] References Cited

U.S. PATENT DOCUMENTS

| | | | |
|---|---|---|---|
| 3,935,873 | 2/1976 | Johnson | 221/270 |
| 4,019,452 | 4/1977 | Rouse | 414/797.9 |
| 4,068,767 | 1/1978 | Tippetts | 414/797.9 |
| 4,073,373 | 2/1978 | Crowley et al. | 414/797.9 |
| 5,082,268 | 1/1992 | Santoro | 414/797.9 |
| 5,105,980 | 4/1992 | Hofmann | 221/270 |
| 5,306,115 | 4/1994 | Montalvo et al. | 414/797.9 |
| 5,370,495 | 12/1994 | Montalvo et al. | 414/797.9 |
| 5,464,117 | 11/1995 | Balsimo | 221/263 |
| 5,904,467 | 5/1999 | Kang | 414/797.9 |

*Primary Examiner*—Douglas Hess
*Attorney, Agent, or Firm*—Harness, Dickey & Pierce, P.L.C.

[57] ABSTRACT

A dispensing apparatus is disclosed which includes a support assembly for defining at least one dispensing location. A storage container is secured to the support assembly for holding a plurality of stackable objects. These stackable objects may include shims, washers, gaskets and seals. An escapement is operably associated with the support assembly. The escapement is operable for moving between a first position and a second position for transporting at least one of the stackable objects from the storage container to an external access location. The escapement may also be designed to be easily operated by a robot or robot actuated apparatus.

24 Claims, 5 Drawing Sheets

ROBOT-BASED DISPENSING STATION

BACKGROUND OF THE INVENTION

1. Technical Field

The present invention relates generally to a dispensing apparatus and more particularly to a robot-actuated dispensing station for dispensing a variety of similarly dimensioned objects.

2. Discussion

The implementation of robots to automate various manufacturing processes has dramatically increased in an effort to reduce the labor and production costs associated with these processes. Robots now perform many of the more hazardous and highly repetitive operations in the manufacturing process. These operations include dispensing, deburring, grinding, polishing, painting, finish coating, cutting and welding. Robots are capable of achieving even greater efficiency when several of these operations are combined at a single workstation. For example, providing a robot with welding and grinding tools allows a single robot to first weld the workpiece, and then grind the workpiece as necessary at a single workstation. For even greater efficiency, the same robot may be equipped with an optical system for finally inspecting the quality of the finished weldment. Robots may also be used to assemble various components, measure or inspect the tolerances of these components, and finally perform any necessary adjustments to the subassembly for completing the requisite operations.

An exemplary implementation of robots for automating an assembly operation is the assembly of the components associated with an automobile rear end axle. Conventional assembly techniques require that a shim or adjusting washer be placed on the pinion stem between the pinion gear and the pinion's conical bearing. A shim of the correct thickness must support the pinion gear on the inner race of the conical bearing for properly positioning the pinion gear within the rear axle housing.

In an exemplary assembly process, a partially assembled rear axle housing travels along a palletized conveyor and enters an assembly and gaging station. The parts to be assembled are contained on the pallet. A robot located within the workstation places the conical bearing upon the gage head. At this point, no shim is present between the gage head and conical bearing. As the robot moves away from the subassembly, a gaging mechanism is lowered onto the conical bearing for measuring the various tolerances associated with the subassembly. At this point, the gaging station is capable of calculating the proper thickness shim which must be placed between the pinion gear and conical bearing. As this occurs, the gaging mechanism is lifted away from the subassembly and a call for a particular shim is sent to the robot's controller. The robot then moves to a static dispensing station located in the cell and selects the correct size shim.

The robot presents the shim to the automated verifier. If this thickness is correct, or within accepted tolerance levels, the robot selects the verified shim and places the shim on the pinion stem. The robot removes the conical bearing from the gage head and sets the conical bearing on the pinion stem and moves away from the subassembly. If the tolerances are within the acceptable range, the gaging mechanism is lifted away and the pallet moves toward the next workstation. If the tolerances are unacceptable, the pallet can be rejected, or the components disassembled so that the assembly process can again be cycled.

The conventional technique for supplying the robot with the correct thickness shim was to locate a motorized and automated dispensing apparatus within the workstation. The conventional dispensing apparatus utilized a round, rotary table having a plurality of storage tubes mounted at the perimeter. Each storage tube was then filled with a stack of shims having the same thickness. Rotation of the table was controlled by a programmable servo-driven gear box for rotating the table to align the proper storage tube over a fixed position powered escapement. Once the proper tube was correctly aligned, the powered escapement was actuated for dispensing the shim into a shim thickness verifier. After measuring and verifying the correct shim thickness, the robot could select the shim from the verifier and place it onto the subassembly. This conventional design was based upon many tubes which were actuated by a single powered escapement.

While this conventional technique for dispensing similarly dimensioned parts automates the dispensing process, this automated technique also duplicates several of the functions which can be performed by the robot for achieving greater efficiency. In addition to the expense associated with the electronically controlled robot, the rotary indexing table also requires expensive electronic equipment and control systems for powering and automating the rotary table. Further, the conventional rotary table shim dispensers utilize a single universal escapement which must be capable of accommodating all sizes of shims. Such a design can lead to jamming of the shims within the escapement, which requires intervention by an operator, and may lead to assembly line shutdown. Further, cycle time associated with a rotary table varies from cycle to cycle, and is dependent upon the distance the table must rotate. Accordingly, an assembly process dependent upon a rotary dispensing table must be designed to operate at the longest cycle time, rather than upon a constant cycle time. An additional disadvantage is that when a wide range of different sized shims must be dispensed, the rotary table circumference increases and requires a large area of the manufacturing floor. Adding a second table increases floor space demands and doubles the cost for equipment. Finally, the robotic manufacturing cell and rotary table must be shut down in order to restock the storage containers with a new supply of shims. All of these factors significantly increase the cost associated with the manufacturing cell and automated dispensing apparatus. These considerations also contribute to the reliability of the apparatus, and the skill level of the operator required for maintaining the automated dispensing apparatus.

Accordingly, it is desirable to provide a dispensing station which can overcome the complexity and cost problems associated with conventional shim dispensing stations and maximizes the use of the robot's features. It is also desirable to provide a low cost shim dispensing station which eliminates the need for powered components, and does not require wires, switches, or other manufacturing facility utilities. Such a device would eliminate the need to have air hoses, steam lines, and multiple electrical lines brought into the manufacturing cell to power the dispensing station. Further, it is desirable to provide a dispensing station which can be refilled with components without shutting off the power, or interrupting the production line. As the cycle times within the manufacturing cell are an increasing concern, it is desirable to provide a dispensing station for reducing the cycle time required to dispense the individual components. Further, it is desirable to provide a dispensing station which can dispense more components using less floor space. Finally, it is desirable to provide a dispensing station having individual escapements which can be custom sized to accommodate the part or shim that is stored in that escapement's storage container.

SUMMARY OF THE INVENTION

Pursuant to the present invention, a dispensing apparatus is disclosed which overcomes many of the disadvantages associated with conventional dispensing stations. The dispensing apparatus of the present invention includes a support assembly for defining at least one dispensing location. A storage container is secured to the support assembly for holding a plurality of stackable objects. These stackable objects may include, but are not limited to shims, washers, gaskets, seals and bearings. An escapement is supported by the support assembly. The escapement is operable for moving between a first position and a second position for transporting at least one of the stackable objects from the storage container to an external access location. In the preferred embodiment, the escapement is actuated between the first and second positions by a multi-axis robot.

BRIEF DESCRIPTION OF THE DRAWINGS

Additional objects, advantages, and features of the present invention will become apparent from the following description and appended claims, taken in conjunction with the accompanying drawings in which:

DETAILED DESCRIPTION OF THE PREFERRED EMBODIMENT

The following description of the preferred embodiments is merely exemplary in nature and is in no way intended to limit the invention, its applications or uses.

Figure 1:
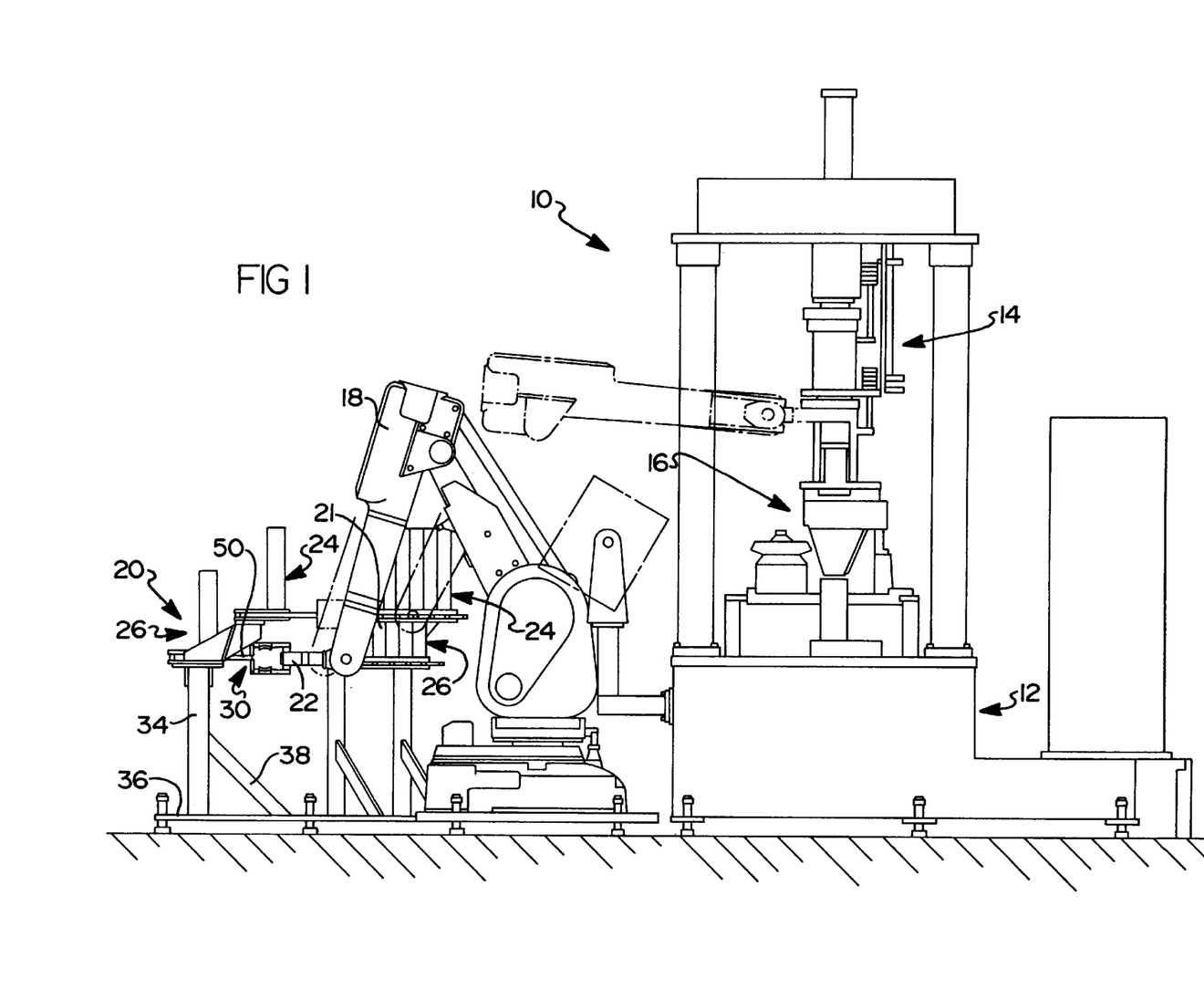
FIG. 1 is a side elevation view of the dispensing station according to the preferred embodiment of the present invention shown in association with a robot based manufacturing and gaging station.

The present invention is directed to a simplified and low cost dispensing station which serves to reduce cycle times, and which may be actuated by a robot. Referring now to FIG. 1, the manufacturing environment which is supported by the dispensing apparatus of the present invention is illustrated. More particularly, the preferred manufacturing environment is robot based manufacturing cell 10 for assembling and gaging the pinion gear subassembly associated with the rear axle housing of an automobile. Robot based manufacturing cell 10 operates in conjunction with a palletized conveyor system 12 along which the various components of the rear axle housing travel. Positioned above palletized conveyor system 12 is a gaging station 14 which is capable of measuring the tolerances associated with the pinion gear subassembly under a variety of simulated load conditions. The rear end components 16 contained on a pallet are transported into gaging station 14 where the various assembly and measuring operations are performed. As disclosed, gaging station 14 is an automated machine that works in conjunction with a multi-axis robot 18 for completing the requisite operations.

In keeping with the conventional techniques for assembling an automotive rear axle housing, a shim of the correct thickness must be placed between the pinion gear and the conical bearing for aligning the pinion gear within the rear axle housing. The goal of robot based manufacturing cell 10 is to quickly and efficiently measure for the correct thickness shim, and place this shim onto the pinion gear stem using a low cost automated process. In the preferred embodiment, a pair of nearly identical dispensing stations 20, 21 in accordance with the teachings of the present invention are provided for storing and dispensing the full range of shims required in the assembly process. As will be appreciated, dispensing stations 20, 21 are mechanical devices with no automated or powered controls. Thus, each dispensing station 20, 21 must be manually actuated, preferably by a multi-axis robot 18, which is provided with a multi-function robotic gripping apparatus 22.

In this exemplary assembly process, robot 18 removes a shim from one of the dispensing locations 30 associated with dispensing station 20 using the gripping arm 22 and places the shim on the stem of the pinion gear. The robot 18 then grabs the conical bearing from the pallet and places the conical bearing onto the pinion stem and moves away. Gaging station 14 then measures the tolerances associated with this subassembly. During this measurement operation, robot 18 moves back toward dispensing station 20 and actuates the escapement 50 (FIG. 3) of the dispensing location 30 from which the shim was just removed for dispensing or indexing a new shim for refilling that dispensing location 30.

Figure 2:
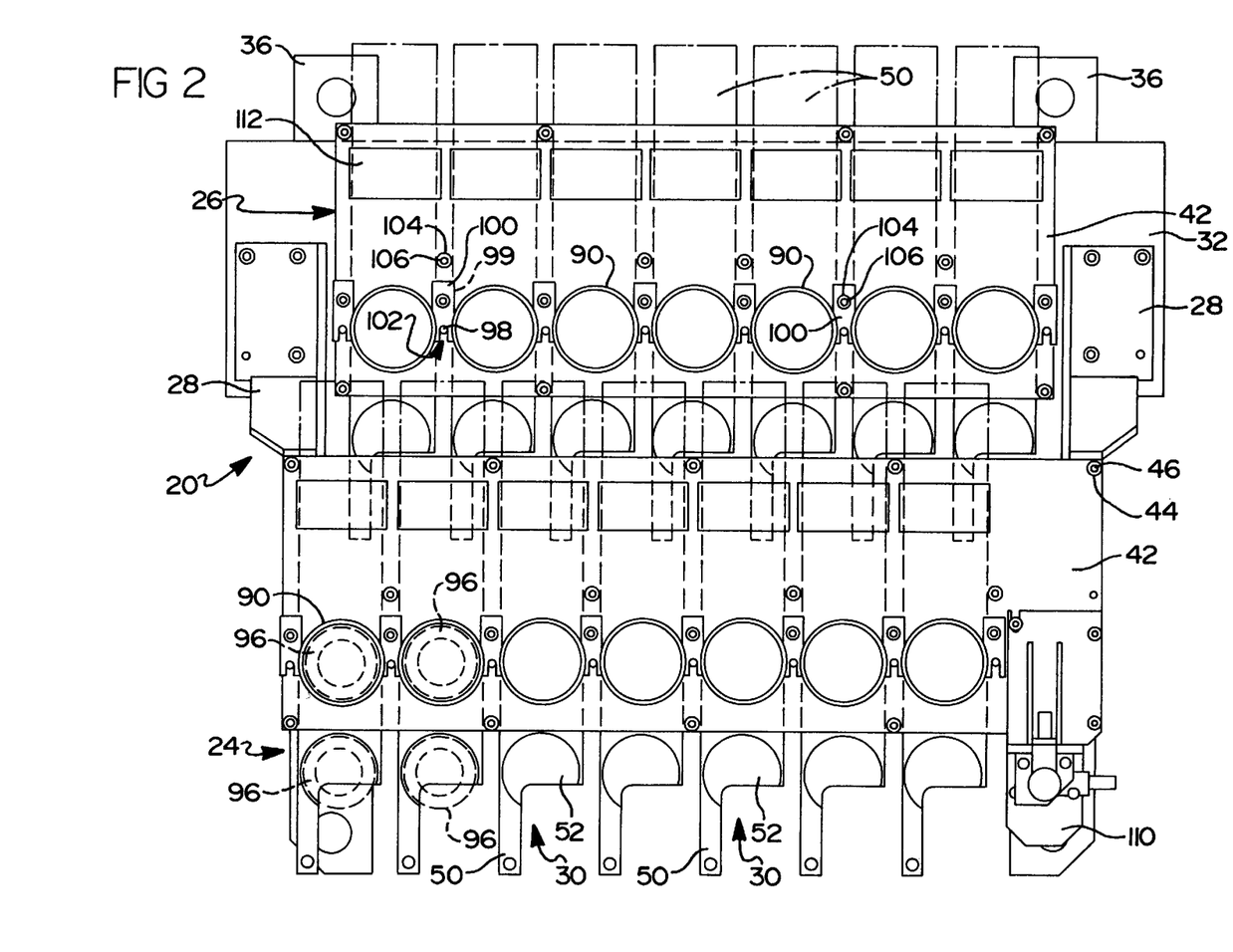
FIG. 2 is a top plan view of the dispensing station having two rows of storage containers and dispensing ports according to one preferred embodiment of the present invention.

If the measurements produced by gaging station 14 fall within an acceptable tolerance range, the pallet and components 16 are transported by conveyor system 12 to the next workstation. In this preferred manufacturing process, 29 different shims can be accessed by robot 18 for completing the pinion gear subassembly. As such, 29 different dispensing locations are required for dispensing these shims. As seen in FIG. 1, these 29 separate dispensing locations are provided by two dispensing stations 20, 21 which are preferably offset from each other by 45°. Each dispensing station 20, 21 is essentially identical to the other. However, in one preferred embodiment, one of the dispensing locations 30 of dispensing station 20 is replaced with a shim thickness verification device 110 (FIG. 2). According to this preferred embodiment, dispensing station 20 includes fourteen (14) separate dispensing locations 30 (FIG. 2), and dispensing station 21 includes fifteen (15) separate dispensing locations 30 (not shown). Each dispensing station 20, 21 is positioned within robot based manufacturing cell 10 so that robot 18 can efficiently access each of the dispensing locations 30.

With reference now to FIGS. 1 and 2, the components associated with dispensing station 20 are described in more detail. However, as will be appreciated, the following description also applies to dispensing station 21. As disclosed, dispensing station 20 includes an upper dispensing block 24 which is positioned above and forward of a lower dispensing block 26. FIG. 1 illustrates robot 18 accessing one of the dispensing locations 30 located in the lower dispensing block 26. The upper dispensing block 24 is supported by a connecting bracket 28 which is interconnected to the supporting structure of the dispensing station 20. Connecting bracket 28 provides the requisite clearance so that gripping apparatus 22 is capable of reaching underneath upper dispensing block 24 for accessing lower dispensing block 26. The lower dispensing block 26 is secured to a mounting plate 32 supported by mounting post 34 (FIG. 1). A base plate 36 is bolted to the manufacturing floor and rigidly supports mounting post 34. A reinforcing bracket 38 (FIG. 1) welded between mounting post 34 and base plate 36 provides additional support for the dispensing station 20.

FIG. 2 illustrates a top view of one preferred embodiment of dispensing station 20 which includes fourteen (14) separate dispensing locations 30, each dispensing a different sized shim 96. However, one skilled in the art will appreciate that dispensing station 20 is not limited to dispensing shims, and may be modified to dispense a variety of stackable objects without departing from the scope of the present invention. Each dispensing location 30 includes a manually actuated escapement 50 which dispenses and supports a shim 96. A shim thickness verifier 110 is provided at the right side of upper dispensing block 24. In comparison, dispensing station 21 is provided with a fifteenth dispensing location 30 (not shown) in place of shim verifier 110. Although this alternate embodiment of dispensing station 21 is not specifically shown, one skilled in the art will readily appreciate that the number of dispensing locations 30 can be increased or decreased without deviating from the scope of the present invention.

The individual sized shims 96 are stacked within separate storage containers 90 mounted to the top surface of upper and lower dispensing blocks 24, 26. A significant benefit provided by dispensing station 20 is that the operator may restock each storage container 90 with additional components from the back side of dispensing station 20. As such, the manufacturing cell 10 does not have to be shut down to restock each dispensing station 20. Further, the operator may safely restock each storage container 90 from the back side without entering the area of operation of the robot 18.

Turning now to FIGS. 3 through 7, the components associated with each dispensing location 30 are illustrated in more detail. Each dispensing block 24, 26 is defined by a lower plate 40 having an upper plate 42 bolted thereto. Lower plate 40 includes a series of threaded apertures into which threaded studs 44 are secured. Each threaded stud 44 is provided with a spacer 48 having a uniform height. Upper plate 42 is provided with a series of smooth bores for receiving the top portion of each threaded stud 44. Each threaded stud 44 is then provided with a washer 45 and retaining nut 46 which secures the upper plate 42 in parallel alignment with the lower plate 40.

Each dispensing location 30 is defined by an escapement 50 which is disposed between the lower and upper plates 40, 42. Each escapement 50 is moveable between a forward position, best shown in FIG. 3, and a rearward position, best shown in FIG. 4. Escapement 50 normally remains in the forward position so that shim 96 is accessible to the robotic gripping apparatus 22. After the shim 96 is removed from dispensing location 30, the escapement 50 may be moved or actuated into the rearward position (FIG. 4) for acquiring a new shim 96 from the storage container 90, and then moved back into the forward position for transporting the shim 96 to the dispensing location 30.

To accomplish the dispensing of individual shims, each escapement 50 is provided with a recess 52 within its top surface. The depth of each recess 52 is selected to best accommodate the thickness of the particular shim 96 dispensed by that particular escapement 50. While it is preferred that recess 52 take on an arcuate shape for dispensing arcuate shims, recess 52 can be formed to accommodate a variety of objects for dispensing. Each escapement 50 is also provided with a cut-out portion 54 for exposing the forward portion of each shim 96, and facilitate the selection of the shim from recess 52 by the gripping arm 22. Each escapement 50 is also provided with a forward tab 56 having an aperture 58 bored therethrough. Forward tab 56 provides a location for the gripping apparatus 22 to grasp and actuate the escapement 50. Aperture 58 allows light from a fiber optic sensor associated with gripping apparatus 22 to pass therethrough. As such, the gripping apparatus 22 can determine if escapement 50 is correctly positioned within dispensing station 20.

The underside of each escapement 50 is provided with an elongated slot 60 having a forward stopping end 62 and a rearward stopping end 64. Preferably, stopping ends 62, 64 are rounded. Elongated slot 60 works in conjunction with a guiding assembly 70 for defining the stroke or range of travel of the escapement 50. Guiding assembly 70 includes a forward roller and threaded stud assembly 72, and a rearward roller and threaded stud assembly 76. Forward roller 72 is secured to lower plate 40 with fastener 74, and rearward roller 76 is secured to lower plate 40 with fastener 78. The forward and rearward rollers 72, 76 are disposed within the elongated slot 60 of each escapement 50. As can be appreciated, guiding assembly 70 works in conjunction with elongated slot 60 for guiding escapement 50 between its forward and rearward positions. The engagement of rearward stopping end 64 with rearward roller 76 defines the forward position of escapement 50. Likewise, the engagement of forward stopping end 62 with forward roller 72 defines the rearward position for escapement 50. As disclosed, forward and rearward rollers 72, 76 are preferably a roller bearing assembly in which the inner race (not shown) is rigidly secured to the threaded stud portion, and the outer roller functions as a cam mechanism for rollingly guiding the escapement 50 via elongated slot 60. Accordingly, elongated slot 60 acts as a follower.

Figures 3, 4:
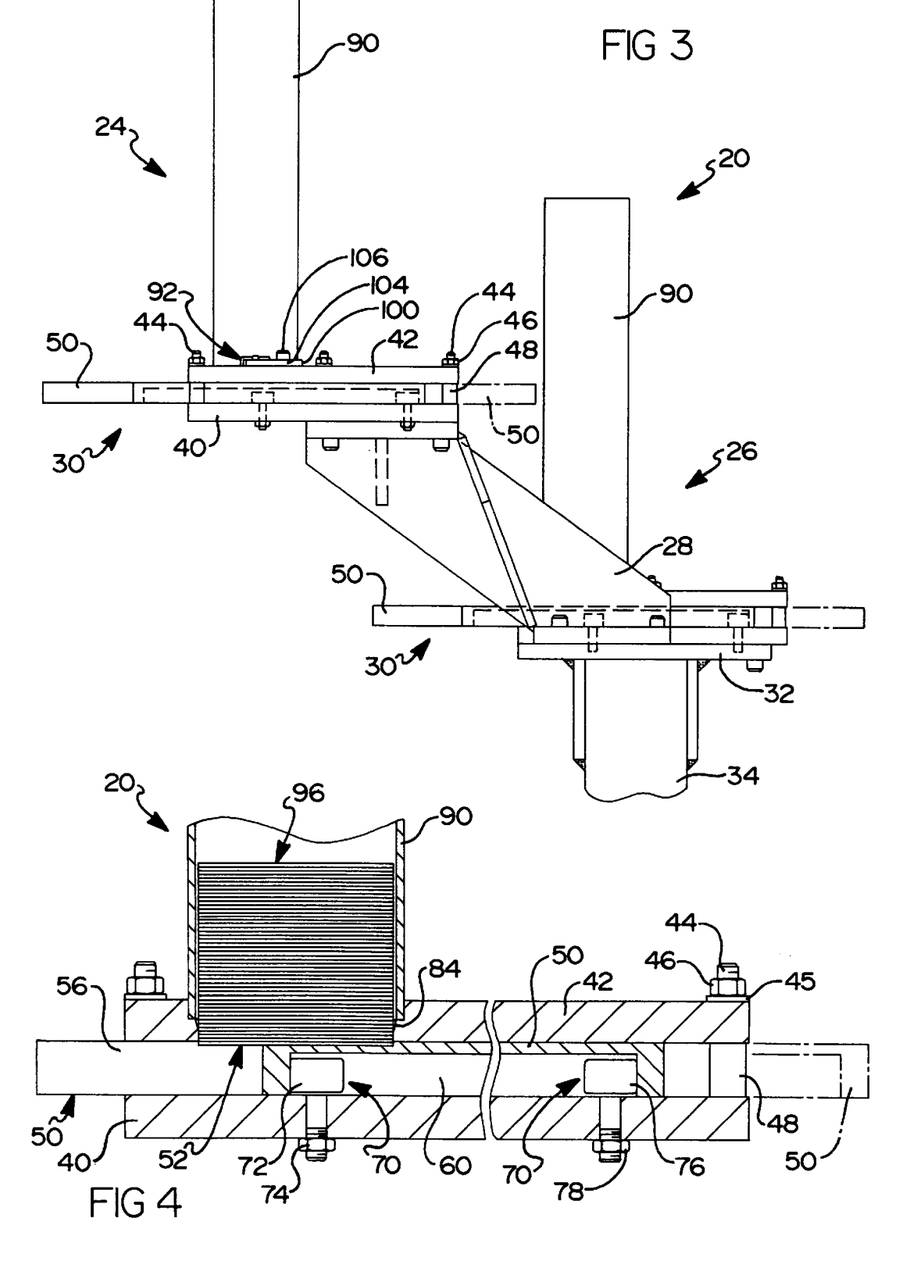
FIG. 3 is a side elevation view of the dispensing station according to a second preferred embodiment of the present invention.
FIG. 4 is an enlarged side elevation view showing a section of the dispensing station and its guiding assembly according to a preferred embodiment of the present invention.
Figure 5:
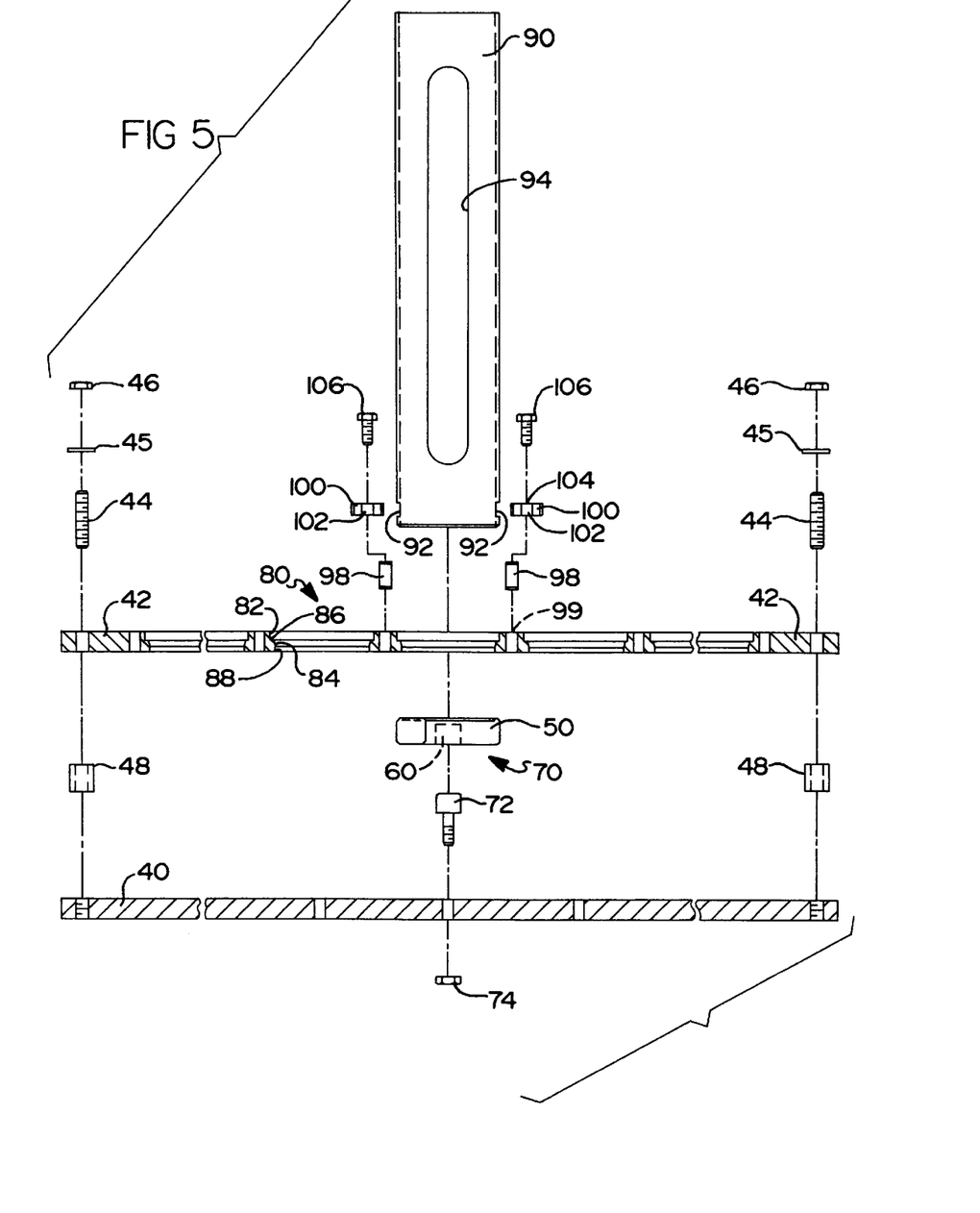
FIG. 5 is an exploded front elevation view of one dispensing location of the dispensing apparatus according to a preferred embodiment of the present invention.
Figure 6:
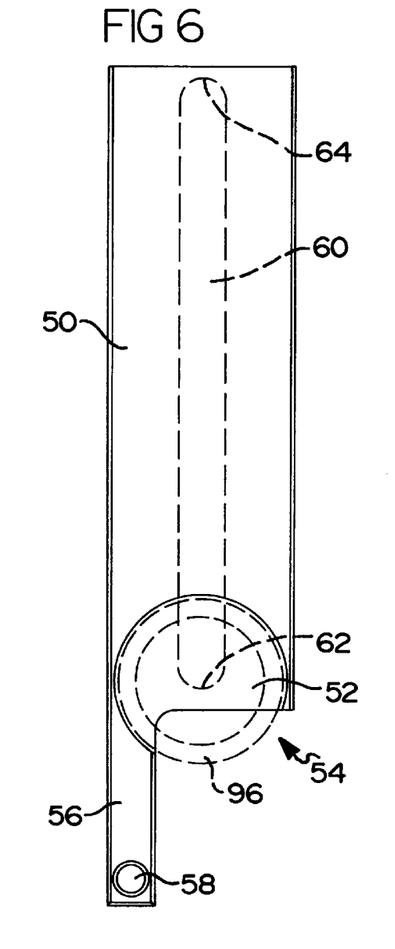
FIG. 6 is a top plan view of the escapement associated with the dispensing station of the present invention.
Figure 7:
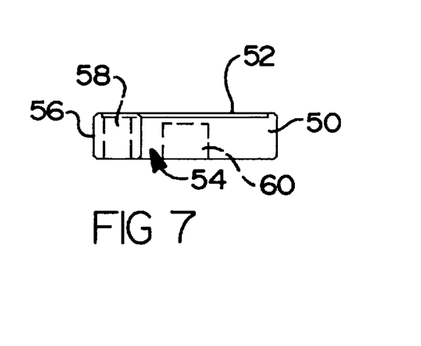
FIG. 7 is a front elevation view of the escapement associated with the dispensing station of the present invention.

With specific reference to FIGS. 4 and 5, the circular apertures 80 which are machined into upper plate 42 for further defining each dispensing location 30 are described in more detail. Each circular aperture 80 includes a first retaining aperture 82 which is straight bored through approximately one half the thickness of upper plate 42. A second tapered aperture 84 is milled within the intermediate thickness of upper plate 42, and a third aperture 88 having the smallest diameter is bored through the lower portion of upper plate 42. The milled portion between the first retaining aperture 82 and second tapered aperture 84 defines a shoulder portion 86 for supporting the lower end of the storage container 90. As best viewed in FIG. 4, the tapered circumference of second tapered aperture 84 serves to guide each shim 96 through the transition from the storage container 90 into the third aperture 88, and into recess 52 of each escapement 50. This unique feature serves to prevent any binding of the shims as they move downwardly for dispensing by the escapement 50.

Each storage container 90 is secured within its retaining aperture 82 by a pair of retaining plates 100. The design of storage containers 90 and retaining plates 100 also facilitates the easy removal of each storage container 90. The storage containers 90 are provided with a pair of retaining grooves 92 milled into opposing sides. A pair of locating pins 98

(FIGS. 2, 5) are located on each side of the circular apertures 80. A threaded aperture 99 is located directly behind each locating pin 98. Each retaining plate 100 includes a U-shaped channel 102 (FIGS. 2, 5) in its forward end for alignment with locating pin 98, and an aperture 104 (FIG. 2) located in its rearward end for alignment with threaded aperture 99 formed in upper plate 42. Each storage container 90 is mounted to upper plate 42 by inserting the lower end into first retaining aperture 82. The pair of retaining plates 1 00 are inserted into retaining grooves 92 and moved forwardly so that locating pin 98 fully engages U-shaped channel 102. A threaded fastener 106 is inserted through aperture 104 of each retaining plate 100 and into threaded aperture 99 for rigidly securing the retaining plate 100 and thus the storage container 90 to upper plate 42.

The storage containers 90 also include a pair of opposing cut-away portions 94 which allow the quantity of shims 96 held within the storage container 90 to be viewed by the operator, and also allow a fiber optic detection system associated with gripping arm 22 to automatically verify the presence of shims. Optionally, a part ID plate 112 (FIG. 2) can be affixed to the top surface of upper plate 42 in the area directly behind each storage container 90 for identifying the thickness of the shims to be held in that particular storage container 90.

Figure 8:
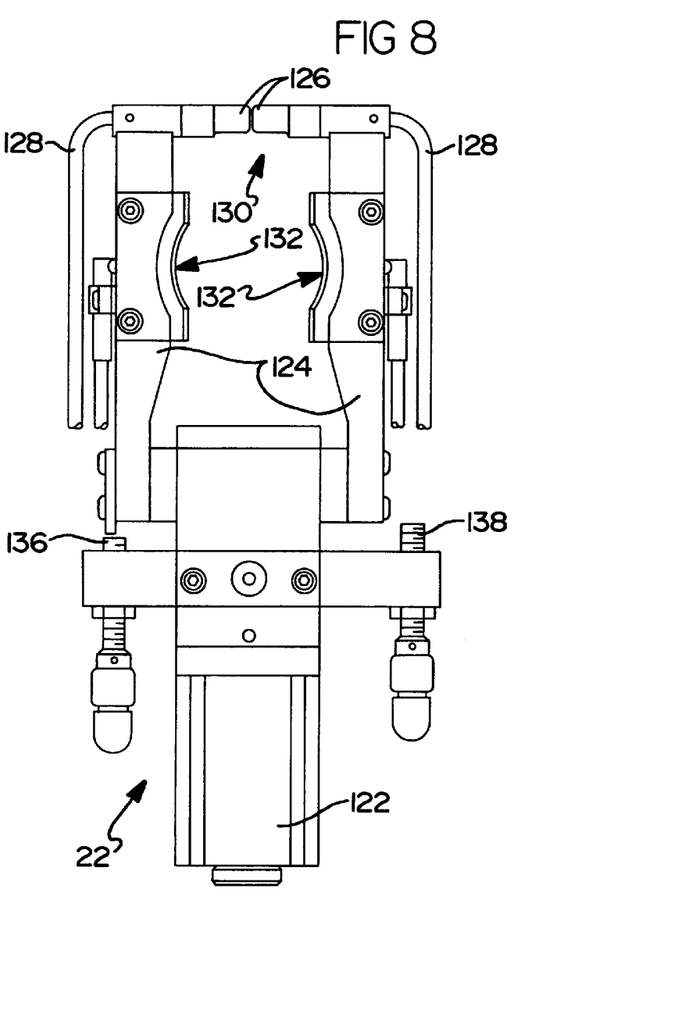
FIG. 8 is a top plan view of the robotic gripping apparatus for use in conjunction with the dispensing station according to a preferred embodiment of the present invention.

Turning now to FIG. 8, the robotic gripping apparatus 22 which is suitable for use with the dispensing station 20 of the present invention is illustrated. The sixth axis of robot 18 is secured to an actuating motor housing 122. A pair of opposing gripping arms 124 are mounted through opposite sides of the actuating motor housing 122. Each gripping arm 124 is provided with a gripping tip 126 having a fiber optic cable 128 disposed through a central portion thereof. Gripping tips 126 provide several functions to gripping apparatus 22. As disclosed, gripping tips 126 are formed from a softer plastic or rubber composition for providing a shim carrier 130 when the gripping tips 126 are moved together. The central core of each gripping tip 126 acts as an optical sensor. More specifically, a shim which is properly disposed between gripping tips 126 will break the fiber optic light beam traveling through fiber optic cable 128. As such, the robot's controller can determine the presence of a properly located shim 96. Likewise, when gripping tips 126 grasp aperture 58 of forward tab 56, thus allowing light traveling within fiber optic table 128 to pass therethrough, the robot's controller can determine whether the escapement 50 is located in its proper position prior to grasping forward tab 56 and actuating the escapement 50. Finally, gripping apparatus 22 is provided with a conical bearing carrier 132 for grasping the bearing and placing the bearing upon the pinion stem as described above.

With reference now to all of the Figures, the preferred operation of dispensing station 20 is described. While an exemplary manufacturing environment which utilizes the preferred embodiment of dispensing station or stations 20 has been described, one skilled in the art will appreciate that dispensing station 20 is not limited to dispensing annular shims 96. It can further be appreciated that the dimensions of escapement 50 and storage container 90 can be varied to accommodate a wide variety of stackable objects without deviating from the scope of the present invention. Such objects may include, but are not limited to, metallic or non-metallic disks, washers, seals, gaskets, bearings, as well as any other type of similarly dimensioned components.

The preferred mode of operation for dispensing station 20 is to fully stock each storage container 90 with a quantity of shims 96. Prior to the commencement of assembly operations within robot based manufacturing cell 10, either the cell operator or the robot 18 can verify that a shim 96 is located within recess 52 at each dispensing location 30, and that each escapement 50 is properly located in the forward position. The fiber optic inspection system associated with fiber optic cable 128 provides an exemplary sensor for making such a preliminary inspection. During the assembly operations within robot based manufacturing cell 10, gaging station 14 will provide the robot controller with the required shim thickness information.

Upon receiving this information, robot 18 moves to the proper dispensing location 30 and withdraws the shim 96 from recess 52. Once the fiber optic system within gripping tips 126 senses the presence of a shim, the shim is moved into shim verifier 112 to verify that the correct thickness shim has been dispensed. If the shim 96 passes this tolerance check, the robot 18 installs the shim onto the pinion stem. If this tolerance check fails, the shim is discarded and a new shim is dispensed. If this verification procedure fails more than three times, the operator will be notified for implementing corrective procedures.

Assuming the correct shim has been properly installed upon the pinion stem, the robot 18 grasps the conical bearing using bearing carrier 132 and places the conical bearing upon the pinion stem and then moves. The shim and conical bearing are then pressed down upon the pinion stem by the press portion of the gaging station 14 and the tolerances are verified. During this idle time, the robot 18 returns to the last dispensing location 30 to dispense a new shim within recess 52 in order to prepare for the next assembly cycle. This is accomplished by gripping apparatus 22 checking the proper location of escapement 50 by placing the opposing gripping tips 126 over aperture 58 and closing. If the beam of light provided by fiber optic cable 128 remains unbroken, the controller can determine that the escapement 50 is properly positioned. The robot 18 then actuates escapement 50 by moving the escapement 50 to the rearward position, guided by guiding assembly 70. As recess 52 becomes aligned directly beneath the stack of shims 96 contained within storage container 90, the shim 96 located at the bottom of the stack will fall into recess 52. Tapered aperture 84 helps to guide the shim 96 and prevent the shim 96 from jamming. The robot 18 holds the escapement 50 in the rearward position momentarily, and then moves the escapement 50 back into the forward position which then exposes a new shim 96 at that dispensing location 30. The robot 18 can then be moved into its home position and the controller notified that the robot 18 is ready to begin the next assembly cycle.

Upon reviewing the above specification in light of the appended drawings, one skilled in the art will readily appreciate the advantages presented by the dispensing station of the present invention. A significant cost savings can be achieved by providing a dispensing station having very few moving parts, and without motorized or automated features and controls. Additionally, the reduction in cycle time achieved by the dispensing station associated with the present invention can be realized because each escapement dispenses a shim in the same amount of time. Finally, the provision for reloading the storage containers allows an operator to restock the dispensing station in a safer environment.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A dispensing apparatus having a plurality of dispensing locations comprising:
   an independent actuator having a gripping tool for actuating the dispensing apparatus;
   a first row of dispensing locations and a second row of dispensing locations, each of the first and second rows of dispensing locations including an upper support plate and a lower support plate defining a plurality of horizontally disposed dispensing locations;
   a bracket disposed between and connecting the first and second rows of dispensing locations, wherein the first row of dispensing locations is positioned above and offset from the second row of dispensing locations;
   a storage container secured to the upper support plate at each dispensing location, the storage container for containing a plurality of stackable objects to be dispensed at the dispensing locations; and
   an escapement associated with each storage container, each escapement being disposed between the upper support plate and the lower support plate and being moveable by the independent actuator between a first position and a second position for transporting at least one of the stackable objects from the storage container to an external access location, wherein the independent actuator can utilize the gripping tool for removing a stackable object from the escapement.

2. The dispensing apparatus of claim 1 wherein the escapement includes a recess sized for supporting at least one of the stackable objects.

3. The dispensing apparatus of claim 2 wherein the recess is disposed directly beneath the storage container when the escapement is positioned in the second position, and whereby the stackable object located at a bottom portion of the storage container is guided into the recess when the escapement is positioned in the second position.

4. The dispensing apparatus of claim 2, wherein the recess is an arcuate recess.

5. The dispensing apparatus of claim 2 wherein the escapement includes a cut-out portion for exposing a forward portion of the stackable object positioned in the recess.

6. The dispensing apparatus of claim 1 wherein the escapement includes a forwardly extending tab having an aperture formed therethrough, said tab providing a gripping area for a robotic gripping apparatus, and said aperture allowing light generated by an optical sensing system associated with said robotic gripping apparatus to pass therethrough.

7. The dispensing apparatus of claim 1 wherein the escapement includes a longitudinal groove for operably engaging a guiding assembly associated with the support assembly.

8. The dispensing apparatus of claim 7 wherein the longitudinal groove includes a first stopping end and a second stopping end.

9. The dispensing apparatus of claim 8 wherein the guiding assembly includes a first roller cam and a second roller cam.

10. A dispensing apparatus for use in an automated manufacturing environment comprising:
    a robot having a robotic gripping apparatus associated with the dispensing apparatus;
    a lower supporting plate;
    an upper supporting plate disposed parallel to the lower supporting plate, the upper and lower supporting plate being disposed on a stand assembly for positioning the dispensing apparatus in proximity to the robot;
    a storage container secured to the upper supporting plate for containing a plurality of stackable objects; and
    an escapement disposed between the upper and lower supporting plates, the escapement including a recess formed in a top surface thereof and a cutout portion for exposing a forward portion of the stackable object positioned within the recess, the escapement further including a forwardly extending tab having an aperture formed therethrough, the tab providing a gripping surface for the robotic gripping apparatus and the aperture allowing light generated by an optical sensing system associated with the robotic gripping apparatus to pass therethrough, the escapement being moveable between a first position and a second position for transporting at least one of the stackable objects from a storage container to an external access location.

11. The dispensing apparatus of claim 10, wherein the recess is sized for supporting at least one of the stackable objects therein.

12. The dispensing apparatus of claim 11 wherein the recess is disposed directly beneath the storage container when the escapement is positioned in the second position, and whereby the stackable object located at a bottom portion of the storage container is guided into the recess when the escapement is positioned in the second position.

13. The dispensing apparatus of claim 11, wherein the recess is an arcuate recess.

14. The dispensing apparatus of claim 10 wherein the escapement includes a longitudinal groove for operably engaging a guiding assembly disposed between the upper supporting plate and the lower supporting plate.

15. A robot actuated dispensing apparatus having a plurality of dispensing locations for use in an automated manufacturing environment comprising:
    a robot having a gripping tool;
    an upper supporting plate and a lower supporting plate defining the plurality of dispensing locations;
    a storage container secured within an annular recess formed in the upper supporting plate, said storage container for containing a plurality of stackable objects;
    an escapement disposed between the upper supporting plate and the lower supporting plate, the escapement being moveable between a first position and a second position for transporting at least one of the stackable objects from the storage container to an external access location wherein the robot can utilize the gripping tool for removing a stackable object from the escapement; and
    a guiding assembly for guiding the escapement;
    whereby the robot actuates the escapement for dispensing the stackable object.

16. The dispensing apparatus of claim 15 wherein the escapement includes a forwardly extending tab having an aperture formed therethrough, said tab providing a gripping area for a robotic gripping apparatus, and said aperture allowing light generated by an optical sensing system associated with said robotic gripping apparatus to pass therethrough.

17. The dispensing apparatus of claim 15 wherein the guiding assembly includes a first roller cam, a second roller cam, and a longitudinal groove formed in the escapement, wherein the roller cams operably engage the longitudinal groove.

18. The dispensing apparatus of claim 15 wherein the escapement includes a recess sized for supporting at least one of the stackable objects.

19. The dispensing apparatus of claim 18 wherein the recess is disposed directly beneath the storage container when the escapement is positioned in the second position, and whereby the stackable object located at a bottom portion of the storage container is guided into the recess when the escapement is positioned in the second position.

20. The dispensing apparatus of claim 18 wherein the recess can be adjusted for accommodating various sized stackable objects contained in the storage container.

21. The dispensing apparatus of claim 18, wherein the recess is an arcuate recess.

22. The dispensing apparatus of claim 15 wherein the stackable object is an annular shim.

23. The dispensing apparatus of claim 18 wherein the escapement includes a cut-out portion for exposing a forward portion of the stackable object positioned in the arcuate recess.

24. The robot actuated dispensing apparatus of claim 15 wherein the stackable object rests upon a top surface of the escapement and a forward portion of the escapement includes a cutout for exposing an upper surface and a lower surface of the stackable object, thereby allowing the gripping tool of the robot to remove the stackable object from the escapement.

* * * * *